United States Patent [19]

Sisco et al.

[11] 3,937,021
[45] Feb. 10, 1976

[54] HOLD OFF VALVE FOR A TWO STAGE SERVOMOTOR

[75] Inventors: William C. Sisco; Frederick G. Grabb, both of South Bend, Ind.

[73] Assignee: The Bendix Corporation, South Bend, Ind.

[22] Filed: July 1, 1974

[21] Appl. No.: 484,381

[52] U.S. Cl................ 60/575; 91/369 A; 91/391 R; 60/553; 60/589; 188/357
[51] Int. Cl.²....................... B60T 11/08; F15B 7/04
[58] Field of Search............ 60/574, 575, 589, 547, 60/591, 576, 1, 586, 592; 188/345, 357; 91/369 A, 391 R, 393, 434

[56] References Cited
UNITED STATES PATENTS

| | | | |
|---|---|---|---|
| 2,880,584 | 4/1959 | French | 60/589 |
| 3,062,011 | 11/1962 | Brooks | 60/576 X |
| 3,473,849 | 10/1969 | Smith et al. | 60/591 X |
| 3,575,001 | 4/1971 | Wilson | 60/589 X |
| 3,800,539 | 4/1974 | LeMarchand | 60/589 X |
| 3,802,199 | 4/1974 | Hagberg, Jr. | 60/574 |

FOREIGN PATENTS OR APPLICATIONS

| | | | |
|---|---|---|---|
| 822,876 | 11/1959 | United Kingdom | 60/589 |

*Primary Examiner*—Martin P. Schwadron
*Assistant Examiner*—H. Burks, Sr.
*Attorney, Agent, or Firm*—Leo H. McCormick, Jr.; William N. Antonis

[57] ABSTRACT

A hold off valve for use in a two stage pressurizing mechanism to control the transition from a first operational condition to a second operational condition. A stepped piston in the pressurizing mechanism has a first diameter and a second diameter through which an input force sequentially operates a control valve to produce a first operational fluid force and a second operational fluid force in a pressurizing chamber. A relief chamber which is connected to the pressurizing chamber receives the first operational fluid force when the control valve is operated. The hold off valve retains the first operational fluid in the relief chamber until a predetermined pressure build up occurs after which the second diameter independently operates to produce the second operational fluid force.

9 Claims, 2 Drawing Figures

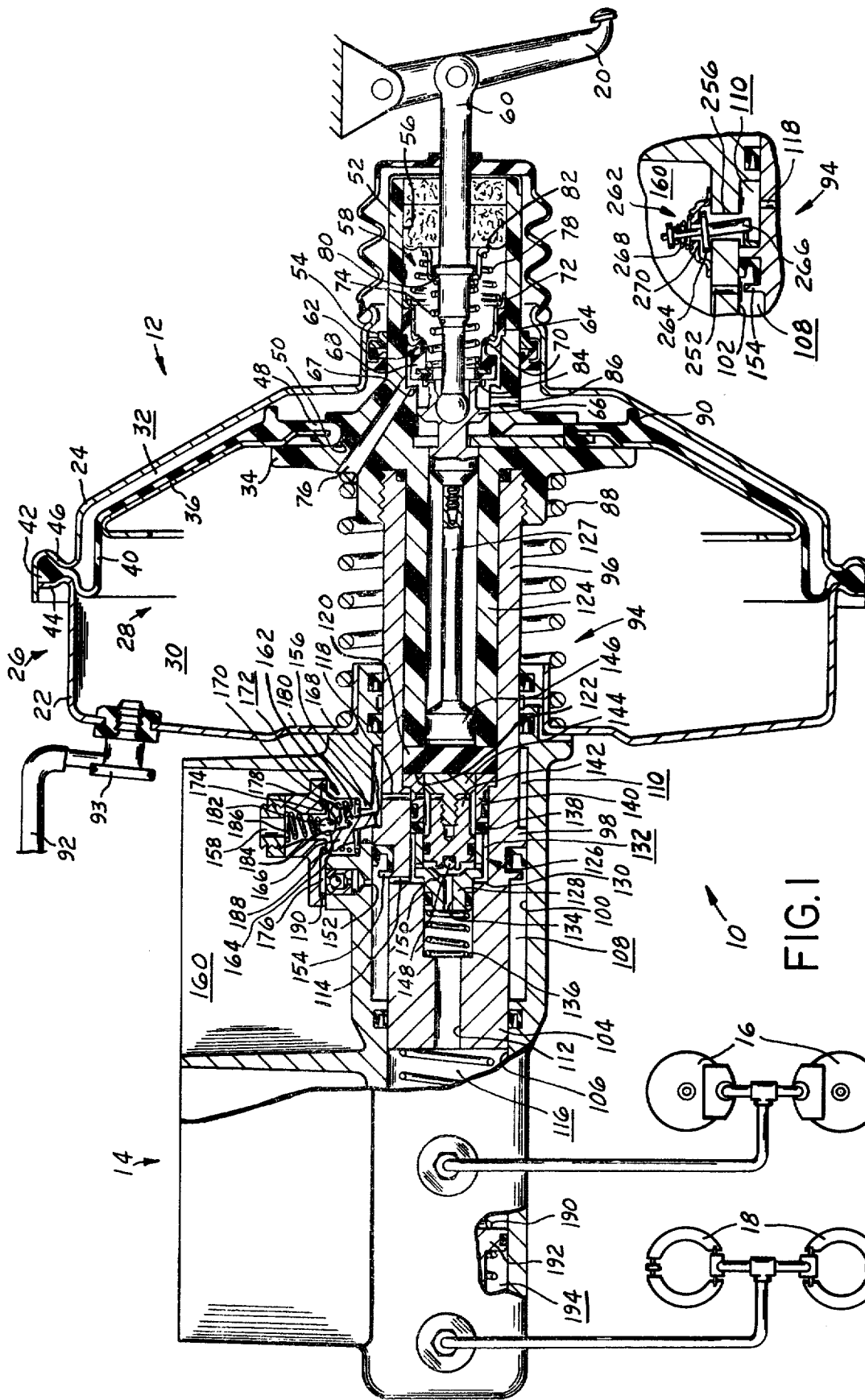

3,937,021

HOLD OFF VALVE FOR A TWO STAGE SERVOMOTOR

BACKGROUND OF THE INVENTION

In copending U.S. application 481,433 filed June 20, 1974, it is disclosed how a stepped diameter piston can sequentially produce a first pressure force and a second pressure force when a transfer control valve is operated by movement of a plunger connected to an input push rod. The input push rod transfers an output force created by the development of a pressure differential across a wall. The stepped diameter piston is connected to the wall. When the transfer control valve is activated, the output force is shifted from acting on a first diameter to act on the second diameter to produce an added output potential. However, in the event that the pressure differential across the wall does not develop, the transfer control valve directly shifts the input force from the first diameter to the second diameter completely eliminating the development of the first pressure force. In most applications, the development of the first pressure force is necessary to supply a braking system with sufficient fluid to allow full development of the second pressure force.

SUMMARY OF THE INVENTION

We have devised a hold off means for delaying the development of the second pressure force until the first pressure force reaches a predetermined value when the transfer control valve is operated by the input force. In our servomotor means a stepped piston means divides the pressurizing chamber of the pressurizing mechanism into a first section and a second section. The first section is connected to a relief chamber through the transfer control valve. The relief chamber is connected to a reservoir through a flow path. A tilt valve means located in the flow path allows communication of fluid from the reservoir when a stem therefrom engages the stepped piston and prevents communication of fluid from the relief chamber when the stepped piston disengages the stem. As the stepped piston moves in response to the input force, the first diameter transfers fluid from the first section through the transfer control valve into the relief chamber. The hold off means prevents any fluid from escaping from the relief chamber until the first pressure force reaches a predetermined value. This same first pressure force is simultaneously supplied to the wheel brakes. When the first pressure force reaches the predetermined value, the hold off means releases fluid to the reservoir and permits the input force to act through that portion of the stepped piston means in the second portion to provide an added output as a second pressure force for operating the wheel brakes.

It is the object of this invention to provide a two stage servomotor with control means for permitting a volume of fluid to be transmitted to an outlet chamber during a first mode of operation after the actuation of transfer control valve means to optimize the development of an output fluid force in a second mode of operation.

It is an object of this invention to provide a two stage servomotor with means for permitting displacement of fluid in the first stage before establishing the second stage when a transfer control valve is opened in response to an initial input force.

It is another object of this invention to provide an actuated tilt valve with an integral relief valve to limit the pressure of fluid in a chamber while maintaining a minimum fluid pressure in the chamber at all times.

It is a further object of this invention to provide a two stage apparatus with a control means for retarding the second operational stage until the first stage has substantially completed its contribution to the total output.

It is a still further object of this invention to provide a relief chamber with a release means for retarding the escape of fluid therefrom until a predetermined pressure build up occurs.

BRIEF DESCRIPTION OF THE DRAWINGS

FIG. 1 is a schematic illustration of a power braking system with a sectional view of a two stage servomotor having a hold off means for permitting a volume of fluid to be supplied to an output chamber during a first stage to optimize the creation of an output fluid force in a second stage.

FIG. 2 is another embodiment of a hold off means to optimize the operation of the second stage of a two stage servomotor.

DETAILED DESCRIPTION OF THE PREFERRED EMBODIMENT

The braking system 10, shown in FIG. 1, has a fluid pressure servomotor 12 connected to a master cylinder 14 for supplying the front wheel brakes 16 and rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub 34 with a backing plate 36 extending therefrom. A diaphragm 40 has a first bead 42 on its periphery which is held between flange 44 and flange 46 on the first shell 22 and the second shell 24, respectively, and a second bead 48 which is snapped onto groove 50 adjacent the backing plate 36.

The hub 34 has a rearwardly extending projection 52 which extends through opening 54 in the second shell 24. The projection 52 has an axial bore 56 into which a control valve means 58 is located for supplying an operational input from pedal 20 through push rod 60.

The control valve means 58 has a poppet assembly 62 which is sequentially operated upon movement of plunger 66 by a push rod 60 to interrupt vacuum and allow air to develop a pressure differential across the wall means 28.

The poppet assembly 62 has a face 68 separated from a fixed bead 64 by a flexible section 70. The bead 64 is retained within bore 56 by a retainer 72 which biases the bead 64 against the projection 52. A first spring 74 connected to shoulder 80 on push rod 60 urges the face 68 toward a vacuum seat 67 adjacent vacuum passage 76. The vacuum passage 76 connects the first chamber 30 with the interior bore 56 of the hub means 34. A second spring 78 located between retainer 72 and fingers 82 on the push rod 60 urges atmospheric seat 84 on the plunger 66 into contact with face 68.

A return spring 88 located between the shell 22 and hub means 34 urges bumper 90 on diaphragm 40 toward shell 24. In this position, vacuum communicated from the intake manifold through conduit 92 past check valve 93 into the front chamber 30 will evacuate air from the second variable volume chamber 32 by way of passage 86 into bore 56 and out passage 76 to vacuum suspend wall means 28.

A ratio changer means 94 has a cylindrical stepped piston means 96 which is attached to the hub means 34. The stepped piston 96 has a first diameter 98 located in a first diameter section 100 and a second diameter 104 located in a second diameter section 106 of the bore of the master cylinder 14. The first diameter 98 of the piston means 96 divides the first diameter section 100 into a pressurizing chamber 108 and a relief chamber 110. An axial passage 112 which extends through the stepped piston means 96 has a first radial passage 114 which connects the pressurizing chamber 108 with an outlet chamber 116 and a second radial passage 118 which connects the pressurizing chamber 108 with the relief chamber 110.

A reaction disc 120 located within the axial passage 112 is positioned against shoulder 122 by a sleeve 124 which extends from the hub means 34. An adjustable plunger extension 127 has one end attached to plunger 66 and the other end aligned by sleeve 124 with the axial center of the reaction disc 120.

A transfer control valve means 126 is located adjacent the reaction disc 120 to regulate the communication of fluid through the axial passage 112. The transfer control valve means 126 has a first sleeve 128 located adjacent shoulder 130 in the transfer control chamber 132. The first sleeve 128 has an axial bore 134 for establishing a flow path from the control chamber 132 into the outlet chamber 116. A spring or resilient means 136 urges the first sleeve 128 into contact with an annular poppet valve 138. The annular poppet valve 138 is attached to a second sleeve 140. The second sleeve 140 forms a guide surface for plunger 142. The plunger 142 has a cylindrical end 144 which abuts the reaction disc 120 and is in direct alignment with end 146 of the adjustable plunger extension 127. A ball valve 148 carried on the end of plunger 142 is adapted to engage seat 150 surrounding the axial bore 134 on the end of the first sleeve 128.

The pressurizing chamber 108 has a port 152 located adjacent lip seal 154 when the bumper 90 is held against shell 24 by return spring 88, as shown in FIG. 1. The relief chamber 110 has a port 156 connected to flow path 158 through which reservoir 160 maintains the fluid in the brake system at a constant level. The communication of the fluid in the flow path 158 from the reservoir 160 is controlled by a tilt valve means 162 located in a release chamber 172. The tilt valve means has a plate or disc 164 secured to a cylindrical section 166 from which a stem 168 extends through port 156 and into the relief chamber 110. A spring 170 located in the release chamber urges the plate or disc 164 toward a seat 174. A passage 176 connects port 152 with the release chamber 172. An axial bore 178 which extends through plate 164 into the cylindrical section 166 is connected to the release chamber 172 by radial passage 180. A ball valve 182 is urged onto a seat 184 surrounding the axial bore 178 by resilient means 186 to prevent fluid flow through the axial bore 178 from the reservoir 160. A first seal 188 surrounds seat 174 and a second seal 190 surrounds the passage 176 to assure that fluid communication from the relief chamber 110 is directed through the flow path 158.

MODE OF OPERATION OF THE PREFERRED EMBODIMENT

When an operator applies an input force to pedal 20, push rod 60 will move to allow spring 74 to move face 68 of the poppet assembly 62 against vacuum seat 67 to interrupt communication between the first chamber 30 and bore 56 through passage 76. Further movement of the push rod 60 will move the atmospheric seat 84 away from face 68 to allow air at atmospheric pressure present in bore 56 to enter the rear chamber 32 through passage 86. With air in the rear chamber 32 and vacuum in the front chamber 30, a pressure differential will be created across the wall means 28. This pressure differential will create an operational force which will be transmitted through the hub means 34 to move the stepped piston 96 in bore of the master cylinder 14. As the first diameter section 98 of the stepped piston 96 moves in the first diameter section 100 a first hydraulic pressure will develop in the pressurizing chamber 108 after the lip seal 154 has moved past passage 152. This first hydraulic pressure will be communicated through passage 114 into control chamber 132, out axial bore 134 and into the outlet chamber 116 for communication to the wheel brakes 16. At the same time spring 190 and the fluid pressure in chamber 116 will move piston 192 to develop a corresponding hydraulic pressure in chamber 194 for operating the rear wheel brakes 18.

The first hydraulic pressure in the control chamber 132 will act on the cylindrical section 144 to balance the input force transmitted to the reaction means 120 through the adjustable plunger extension 127 of the plunger 66. As the operator increases the input force through the push rod 60, the pressure differential across wall means 28 will correspondingly increase until the rear chamber 32 is completely filled with air at atmospheric pressure, commonly referred to as "vacuum runout." Any further input from the operator will be transmitted from plunger 66 through the reaction means 120 to move the second plunger means 142. When sufficient movement has occurred to move ball 148 onto seat 150, communication between the pressurizing chamber 108 and the outlet chamber 116 will be interrupted. Further movement of the plunger 142 will move sleeve 128 in opposition to spring 136 to open the poppet valve 138 and allow the first hydraulic fluid pressure to enter the relief chamber 110. Since spring 170 has seated plate or disc 164 on seat 174 and seal 188, the relief chamber 110 is separated from the reservoir 160. When the pressure in the relief chamber is sufficient to overcome spring 186, ball 182 will move away from seat 184 and allow fluid to escape into the reservoir 160. At the same time, the pressure differential acting across wall 28 will proportionally move the second diameter 104 of the stepped piston 96 in the second diameter section 106 to provide an increased or second stage hydraulic pressure in the outlet chamber 116 for operating the wheel brakes 16 and 18.

Upon termination of the input force, the first diameter 98 of the stepped piston 96 engages stem 168 to open the relief chamber 110 to the reservoir 160. At the same time return spring 78 will move the atmospheric seat 84 against face 68 and face 68 away from the vacuum seat 67 to allow the vacuum present in chamber 30 to evacuate the rear chamber and again vacuum suspend the wall means 28.

In the event that vacuum is not available and the operator is required to make a "no power" brake application the following operational sequence will occur.

The input force applied to pedal 20 will move push rod 60 causing plunger 66 to immediately move face 146 into contact with reaction means 120. Further movement will cause the first diameter section 98 to move away from stem 168 and segregate the relief chamber 110 from the reservoir 160. This input from the plunger 66 by way of face 146 will correspondingly move ball 148 of plunger 142 onto seat 150 and close the communication between the pressurizing chamber 108 and the outlet chamber 116. Further movement of the stepped piston 96 will cause the fluid present in the pressurizing chamber 108 to be communicated through the control chamber 132 out the passage 118 into the relief chamber 110. Since the physical volume of the relief chamber 110 is substantially smaller than that of the pressurizing chamber 108 a first stage hydraulic pressure will be developed.

This first stage hydraulic pressure will act on the plunger 128 to move the seat 150 away from the ball 148 and be communicated to the outlet chamber 116 for distribution to the front wheels 16. When the fluid pressure build up in the relief chamber 110 reaches a predetermined value sufficient to overcome spring 186, ball 182 will move away from seat 184 permitting fluid to escape into the reservoir 160. At the same time any further input from the operator will now move the second diameter 104 in the outlet chamber 116 to provide the second stage hydraulic pressure for operating the wheel brakes.

Upon termination of the input force, the first diameter 98 will engage the stem 168 to provide free communication between the reservoir 160 and the relief chamber 110.

In the secondary embodiment shown in FIG. 2, parts identical to that in FIG. 1 for the hold off means are so identified by the same numeral.

A tilt valve means 262 is located in the compensation port 156 to control the communication between the relief chamber 110 and the reservoir 160. The tilt valve means has a poppet face 264 with a stem 266 which extends into the relief chamber 110 for engagement with diameter 98 of the stepped piston 96. A spring 268 urges the poppet toward a seat 270. The compensation port 252 in the pressurizing chamber 108 is directly connected to the reservoir 160. The compensation port 252 is substantially smaller in size than compensation port 256.

In a no-power condition when the transfer control valve means 126 is activated, the fluid in the pressurizing chamber 108 is transmitted through the control chamber 132 into the relief chamber 110. Since movement of the diameter 98 of the stepped piston 96 in the bore 102 will allow spring 268 to seat poppet face 264 on seat 270, relief chamber 110 will be segregated from the reservoir 160. When stepped piston 96 has moved sufficient such that compensation port 252 is relocated in the relief chamber 110, hydraulic fluid can escape to the reservoir 160 upon opening of the transfer control valve 126. However, the size of port 252 will delay or retard rapid flow from the chamber 110 permitting a first stage hydraulic fluid pressure to build up and be transmitted to the outlet chamber 116 for distribution to the front wheel brakes 16.

Thus, we have provided a hold off means for delaying the formation of second hydraulic fluid pressure until a first hydraulic fluid pressure is developed which is sufficient to provide a braking system with a volume of fluid sufficient to permit the full development of a second hydraulic fluid pressure from a controlled input force.

We claim:

1. In a power braking system having piston means for sequentially producing a first fluid force in a first mode of operation and a second fluid force in a second mode of operation upon actuation of valve means responding to an input force, control means for permitting a volume of fluid to be transmitted to an outlet chamber to establish said first mode of operation when the valve means is actuated by an input force to optimize the development of the second fluid force, said control means comprising:

a housing having a bore therein for retaining said piston means, said piston means dividing said bore into a pressurizing chamber and a relief chamber, said pressurizing chamber communicating fluid to the relief chamber upon actuation of the valve means, said relief chamber being connected to a reservoir through a flow path, said pressurizing chamber being connected to said reservoir through a first port in the housing to allow compensatory fluid to freely flow from the reservoir to said pressurizing chamber; and hold off means for delaying the communication of fluid in the relief chamber to the reservoir upon actuation of the valve means to allow said piston means to move in the pressurizing chamber past said first port in the housing and supply a volume of fluid to the outlet chamber to assure that said first operational fluid force is developed.

2. In the power braking system, as recited in claim 1 wherein said hold off means includes:

tilt valve means connected to said piston means and located in said flow path for preventing flow of fluid from the relief chamber into the reservoir upon disengagement with the piston means.

3. In the power braking system, as recited in claim 2 wherein said housing further includes:

a second port located betwen the relief chamber and the reservoir, said first port having a substantially smaller flow path than said second port, said tilt valve means being located in said second port, said piston means upon moving in said bore past the first port segregating the pressurizing chamber from the reservoir during the production of the first pressurizing fluid force, said piston means moving in the bore sufficiently to bring the relief chamber into communication with said first port, said first operational fluid force being communicated through the first port into the reservoir when said value means is actuated by the input force at a rate sufficiently low to allow the first operational fluid force to operate the braking system.

4. In the power braking system, as recited in claim 3, wherein said hold off means further includes:

relief means connected to the first port for preventing communication from the relief chamber into the reservoir.

5. In the power braking system, as recited in claim 2 wherein said housing further includes:

a first passage connected to said flow path to permit communication between the reservoir and the pressurizing chamber when the piston means engages the tilt valve means, said piston means segregating the first passage from the pressurizing chamber upon disengagement with the tilt valve means to allow development of the first operational fluid force.

6. In the power braking system, as recited in claim 5 wherein said hold off means further includes:

relief means located in the flow path for allowing a volume of fluid to escape from the relief chamber after a predetermined pressure build up has been achieved through the movement of the first piston means in the pressurizing chamber in response to the input force.

7. In the power braking system, as recited in claim 6 wherein said tilt valve means includes:

a plate member located in the flow path having a stem which extends into relief chamber for contacting the piston means; and biasing means for urging said plate toward a seat in the housing surrounding the flow path from the reservoir.

8. In the power braking system, as recited in claim 7 wherein said tilt valve means further includes:

a cylindrical body located between said plate and said stem, said plate having an axial bore therethrough which extends into said cylindrical body, said cylindrical body having a radial passage which connects the axial bore with the flow path between said seat and the relief chamber, said first fluid force present in the relief chamber passing through the radial passage into the axial bore for communication to the reservoir.

9. In the power braking system, as recited in claim 8 wherein said relief means further includes:

a ball located in said flow path; and resilient means for urging said ball toward said plate of said tilt valve means, said ball being seated on the plate to prevent fluid communication through the axial bore when said stem is engaged by the piston means and to allow fluid communication through the axial bore when the first fluid force in the relief chamber is sufficient to overcome said resilient means.

* * * * *